April 16, 1963

H. LA TOUR 3,085,528

METHOD AND APPARATUS FOR FABRICATING
ARTICLES OF COATED SHEET METAL

Filed Dec. 28, 1959

INVENTOR.
HARRY LA TOUR

BY

ATTORNEYS.

United States Patent Office 3,085,528
Patented Apr. 16, 1963

3,085,528
METHOD AND APPARATUS FOR FABRICATING ARTICLES OF COATED SHEET METAL
Harry La Tour, Middletown, Ohio, assignor to Armco Steel Corporation, Middletown, Ohio, a corporation of Ohio
Filed Dec. 28, 1959, Ser. No. 862,179
4 Claims. (Cl. 113—33)

This invention relates to a method and apparatus for fabricating articles from coated sheet metal. More particularly the invention relates to the treatment of welded steel tubing formed from coated metal wherein the coating in the region of the weld has been destroyed during the welding operation. By the present method and with the use of an apparatus as hereinafter disclosed and claimed, the coating metal in the region of the weld is replaced so as to give the tubing a complete and continuous coating of the coating metal such as it would have had the tubing been dip-coated after fabrication.

In the copending application of Noble Eugene Hays, Serial No. 332,843, filed January 23, 1953, now Patent No. 2,927,371, there is disclosed a method and an apparatus for the same purpose to which the present invention is directed. According to the disclosure of said copending application, molten zinc (if zinc is the coating metal being used) is sprayed along the weld line immediately following the welding operation so that the area of the weld upon which the sprayed coating metal impinges is above the melting point of the metal being sprayed. Thus, the coating metal flows and in due course freezes after having covered the area from which the initial coating metal has been burned off.

While success has been achieved with the method and the apparatus of the above mentioned application, it is subject to difficulties of control and there is a tendency for the metal being sprayed to fall elsewhere in addition to the desired location so that other portions of the tubing as well as the equipment become covered with coating metal.

It is an object of the present invention to provide a method for accomplishing the same purpose as above outlined but which is not subject to the difficulties mentioned above and which is relatively easy to control and which day in and day out will produce better results than have been possible by the method described above.

These and other objects of the invention which will become apparent to one skilled in the art upon reading these specifications or which will be pointed out hereinafter, I accomplish by that series of steps and by that construction of which I shall now describe an exemplary embodiment.

Figure 1:
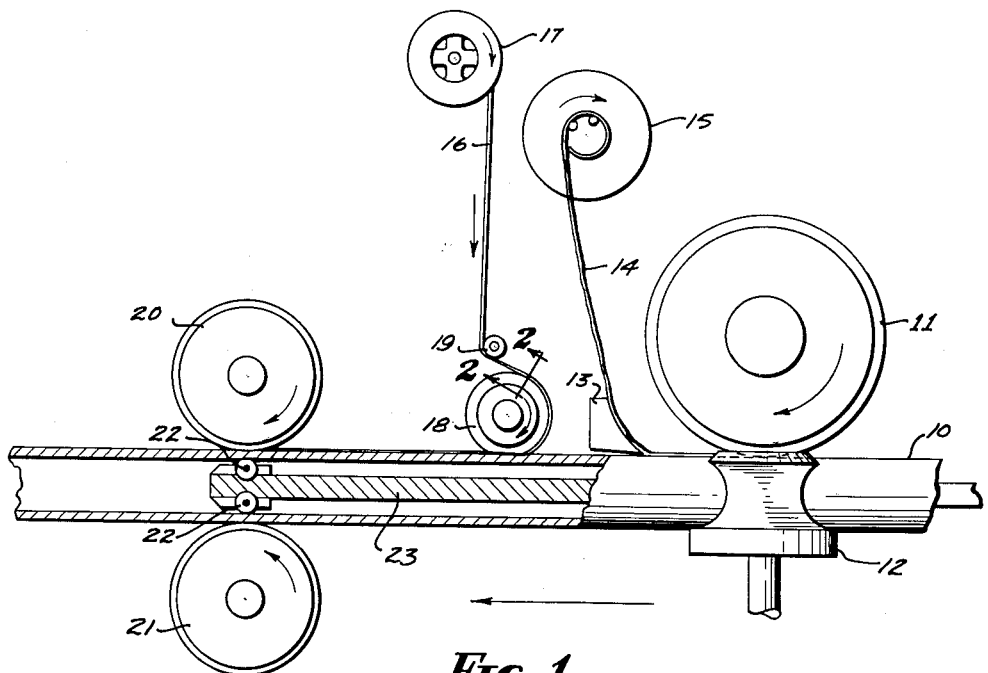
Figure 2:
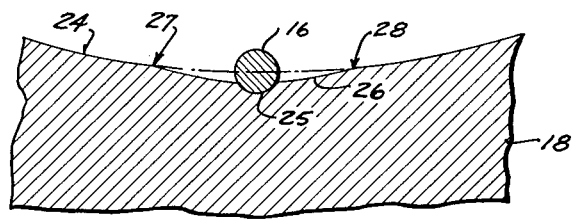

Reference is made to the drawings forming a part hereof and in which:

FIGURE 1 is a somewhat diagrammatic view of an apparatus for carrying out the method, and FIGURE 2 is a fragmentary cross-sectional view on an enlarged scale taken on the line 2—2 of FIGURE 1.

Briefly, in the practice of the invention, I form the steel strip into tubular configuration and weld the seam by means of a rotating welding electrode as is conventional in the art and as described in the said copending application. Since the method of forming and welding the tubing does not constitute a part of the present invention, it will not be described in greater detail.

Immediately after the tubing is welded, I preferably scarf the flash from the weld and then at a point sufficiently close to the welding electrode that the area of the weld is above the melting point of the coating metal, I lay down upon the weld continuously a wire or ribbon of the same general material as the coating metal. This wire or ribbon melts and flows so as to join with the original coating metal and to form a continuous coating over the region of the weld. Immediately beyond the station at which the wire or ribbon of coating metal is laid down, I provide means for ironing or rolling down the added coating metal so as to form the finished tube.

It will be understood that the wire or ribbon does not, and indeed must not, melt in the sense of going into the liquid phase until after it is pinched between the roll 18 and the pipe 10; for if it did, it would lose cohesiveness and could no longer be pulled from the supply spool 17.

Referring now in greater detail to the drawings, I have shown in FIGURE 1 the portion of the apparatus from the welding station on. The tube forming portion of the apparatus has not been shown because it is conventional. In FIGURE 1 it will be disposed to the right of the figure and the tubing being formed is considered as moving toward the left.

The formed tubing is indicated at 10 and is shown as passing the welding station where a welding wheel 11 operating against a pair of contoured rolls 12 which support the tubing from below, accomplishes the welding of the seam along the top of the tubing.

At 13 there is shown a scarfing tool which scarfs the flash formed by the welding operation. The flash is indicated at 14 and is shown as being wound upon a flash winder 15 of conventional form.

Immediately beyond the flash winder I have shown a station at which a ribbon or wire of zinc or whatever coating material is being used is applied to the weld. This ribbon is indicated at 16 and is shown as being supplied from a source 17 and being applied by means of a roll 18. A small idler roll 19 is indicated and is provided for the purpose of causing the wire or ribbon 16 to pass around approximately one-half the circumference of the guide roller 18. As will be seen from FIGURE 1, the roller 18 is not supported from below and does not exert any great pressure on the tubing.

At 20 I have shown an ironing or contouring roll cooperating with an opposite contouring roll 21 through the intermediary of the plug rolls 22. The plug rolls are mounted on a plug 23 as is well known in the art.

The roll 18 is shown in greater detail in FIGURE 2. It is provided with a major curvature 24 which conforms to the circumference of the tubing being treated. On its central plane it is provided with a groove 25 of a size and shape to seat the wire or ribbon which is to be applied to the weld. It will be observed that a relatively small portion of the wire is seated in the groove 25.

Extending to both sides of the groove 25 is the intermediate groove 26 which is shallower than the groove 25 but deeper than the curvature 24 whereby to provide a space as indicated into which the wire, upon melting, may flow so as to extend substantially from the point 27 to the point 28.

I have found that if the wire is caused to pass around approximately one-half the circumference of the roll 18 it will be accurately guided to a correct position in relation to the weld and the metal from the wire 16 will be enabled to flow into the space provided by the groove 26 which is of sufficient lateral extent to cover the area in which the coating was destroyed during the welding operation.

Thereafter the roll 20 irons the added coating metal down to contour the pipe to a substantially circular cross section.

I have herein used the words "wire or ribbon" and it is to be understood that it may in some instances be more convenient to use a ribbon of more or less rectangular cross-section rather than a wire of circular cross-section. It should be understood that where the term "wire" is used in the claims, the term is intended to be inclusive of ribbon.

As pointed out above, the important feature of the invention involves the laying down of the wire onto the region of the weld at a time when the temperature of the metal in the region of the weld is still above the melting point of the coating metal. For this reason, the guide roll 18 is placed relatively close to the welding wheel 11. The specific distance will of course be determined by the melting temperature of the specific coating metal being used, the speed of the formed pipe through the apparatus and the use of coolant solutions which may be used.

It will be understood that the invention herein described is applicable to the repair of coating on spiral welded pipe welded by the submerged arc method. In the submerged arc welding process, of course, the layer of fused flux must be removed but this can be accomplished by the scarfing tool. The process is useful in the repair of coating whether the coating is of aluminum, tin, zinc or other generally used metals and alloys.

The specific details of the apparatus disclosed may be varied without departing from the spirit of the invention.

Having now fully described my invention, what I claim as new and desire to secure by Letters Patent is:

1. A method for continuously forming seam welded tubing of steel coated with a coating metal and replacing coating metal destroyed by the seam welding operation, which consists essentially in continuously forming a flat strip of coated steel into tubular configuration and welding the adjacent edges of the formed strip, and thereafter promptly and continuously laying down upon the weld line on the outside of the formed tubing, a wire of metal of the same general composition as said coating metal, at a point in close proximity to the weld point, the said point being so chosen that the temperature of the tube at the weld line is sufficiently high so that said wire will melt and flow subsequent to initial contact with the tubing, and spreading said melted wire coating material over the area formerly occupied by the original coating destroyed by said welding operation, whereby said coating material will firmly bond to the uncoated areas of the tubing and fuse with the original coating remaining on the tubing, so as to form a coating replacing that lost during the welding operation, and rolling down said laid-down coating metal to produce a smooth and finished appearance.

2. A method for continuously forming seam welded tubing of steel coated with a coating metal and replacing coating metal destroyed by the seam welding operation, which consists essentially in continuously forming a flat strip of coated steel into tubular configuration and welding the adjacent edges of the formed strip, continuously scarfing the flash from the weld so produced, and thereafter promptly and continuously laying down upon the weld line on the outside of the formed tubing, a wire of metal of the same general composition as said coating metal, at a point in close proximity to the weld point, the said point being so chosen that the temperature of the tube at the weld line is sufficiently high so that said wire will melt and flow subsequent to initial contact with the tubing, and spreading said melted wire coating material over the area formerly occupied by the original coating destroyed by said welding operation, whereby said coating material will firmly bond to the uncoated areas of the tubing and fuse with the original coating remaining on the tubing, so as to form a coating replacing that lost during the welding operation, and rolling down said laid-down coating metal to produce a smooth and finished appearance.

3. In an apparatus for forming seam welded coated steel tubing, in combination, forming means for forming sheet metal into tubular form with juxtaposed edges, welding means for welding said juxtaposed edges together, means for laying down upon the weld a wire of metal of the same general composition as the coating on said tubing, said laying-down means comprising a wheel having its axis at right angles to the axis of the tubing and its periphery in contact therewith, said wheel having a principal annular groove conforming to the contour of the welded tubing, said annular groove being modified by a central annular groove of a contour to partially seat said wire and a relatively wider portion deeper than said principal groove but shallower than said central groove, said wheel being positioned at such a distance from said welding means that, having regard for the linear speed of the operation and the particular coating metal being used, said wire will be caused to melt and flow laterally of said central annular groove as it passes beneath the said wheel in contact with the weld, and means for rolling down the added coating metal subsequent to its passage beyond said wheel, whereby to shape and smooth the added coating metal to provide a substantially cylindrical tubing in which the added coating metal is firmly bonded to the uncoated areas of the tubing and fused with the original coating remaining on the tubing.

4. Apparatus according to claim 3 including guiding means for said wire positioned to cause said wire to pass around substantially one-half the periphery of said wheel before it is layed down on said weld.

References Cited in the file of this patent

UNITED STATES PATENTS

| | | |
|---|---|---|
| 1,298,590 | Smith | Mar. 25, 1919 |
| 2,188,326 | Windsor et al. | Jan. 30, 1940 |
| 2,224,953 | Dunkelberger et al. | Dec. 17, 1940 |

FOREIGN PATENTS

| | | |
|---|---|---|
| 725,585 | France | Feb. 15, 1932 |
| 347,723 | Great Britain | May 4, 1931 |
| 534,046 | Great Britain | Feb. 26, 1941 |